United States Patent
Nilsson et al.

(10) Patent No.: US 7,381,680 B2
(45) Date of Patent: Jun. 3, 2008

(54) METHOD FOR INCREASING THE STRENGTH OF POROUS CERAMIC BODIES AND BODIES MADE THEREFROM

(75) Inventors: Robert T. Nilsson, Midland, MI (US); Robin P. Ziebarth, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 11/109,274

(22) Filed: Apr. 19, 2005

(65) Prior Publication Data

US 2005/0239640 A1 Oct. 27, 2005

Related U.S. Application Data

(60) Provisional application No. 60/564,011, filed on Apr. 21, 2004.

(51) Int. Cl.
*B01J 21/02* (2006.01)
*B01J 23/00* (2006.01)
*B01J 23/02* (2006.01)
*C04B 40/00* (2006.01)
*C04B 35/00* (2006.01)
*C04B 35/52* (2006.01)
*C04B 35/56* (2006.01)
*B29C 71/00* (2006.01)
*B01D 45/00* (2006.01)

(52) U.S. Cl. ............... 502/202; 502/302; 502/439; 502/527.14; 502/527.24; 264/82; 264/234; 501/1; 501/88; 501/96.1; 501/96.4; 55/423

(58) Field of Classification Search ............. 502/202, 502/439, 527.14, 527.24; 264/82, 234; 501/1, 501/88, 96.1, 96.4

See application file for complete search history.

(56) References Cited

U.S. PATENT DOCUMENTS

| | | | |
|---|---|---|---|
| 2,494,277 A * | 1/1950 | Austin et al. ............... 501/153 |
| 3,399,979 A * | 9/1968 | Hamling ..................... 264/82 |
| 3,649,342 A * | 3/1972 | Bartlett ..................... 428/357 |
| 4,258,099 A * | 3/1981 | Narumiya ............... 210/510.1 |
| 4,515,758 A | 5/1985 | Domesle et al. |
| 4,740,360 A | 4/1988 | Geus et al. |
| 4,904,424 A * | 2/1990 | Johnson ..................... 264/29.2 |
| 5,011,804 A * | 4/1991 | Bergna et al. .............. 501/138 |
| 5,013,705 A | 5/1991 | Koberstein |
| 5,063,192 A | 11/1991 | Murakami et al. |
| 5,098,455 A | 3/1992 | Doty et al. |
| 5,130,109 A | 7/1992 | Wan |
| 5,173,349 A | 12/1992 | Yavuz et al. |
| 5,194,154 A | 3/1993 | Moyer et al. |
| 5,198,007 A | 3/1993 | Moyer et al. |
| 5,254,519 A | 10/1993 | Wan et al. |
| 5,279,737 A * | 1/1994 | Sekhar et al. ............... 210/490 |
| 5,340,516 A | 8/1994 | Yavuz et al. |
| 5,376,427 A * | 12/1994 | Singh et al. ............... 428/110 |
| 5,635,430 A * | 6/1997 | Divakar et al. ............... 501/90 |
| 5,834,387 A * | 11/1998 | Divakar et al. ............... 501/88 |
| 5,972,489 A * | 10/1999 | Li et al. .................. 428/312.2 |
| 5,993,762 A | 11/1999 | Rajaram et al. |
| 6,306,335 B1 | 10/2001 | Wallin et al. |
| 6,478,994 B1 * | 11/2002 | Sneddon et al. .............. 264/43 |
| 6,596,665 B2 | 7/2003 | Wallin et al. |
| 6,669,751 B1 | 12/2003 | Ohno et al. |
| 6,762,140 B2 * | 7/2004 | Pujari et al. .................. 501/88 |
| 6,764,742 B2 | 7/2004 | Ichikawa et al. |
| 6,777,114 B2 | 8/2004 | Tomita et al. |
| 6,862,970 B2 * | 3/2005 | Aghajanian et al. ....... 89/36.02 |
| 6,919,103 B2 * | 7/2005 | DiChiara, Jr. ............ 427/376.2 |
| 2001/0038810 A1 | 11/2001 | Wallin et al. |
| 2002/0044897 A1 | 4/2002 | Kakwani et al. |
| 2002/0197191 A1 | 12/2002 | Takeshima et al. |
| 2003/0032545 A1* | 2/2003 | DiChiara, Jr. ................ 501/87 |
| 2003/0039796 A1* | 2/2003 | Ito et al. ..................... 428/66.6 |
| 2003/0124037 A1 | 7/2003 | Voss et al. |
| 2004/0020359 A1 | 2/2004 | Koermer et al. |
| 2004/0192534 A1* | 9/2004 | Nixon et al. ............... 501/95.2 |
| 2005/0008878 A1 | 1/2005 | Bryden |

FOREIGN PATENT DOCUMENTS

| | | |
|---|---|---|
| DE | 41 10 329 A1 | 3/1991 |
| EP | 1142619 A1 | 10/2001 |
| GB | 1119180 | 7/1968 |
| GB | 2012309 | 7/1979 |
| WO | WO97/00119 | 1/1997 |
| WO | WO 99/12642 | 3/1999 |
| WO | WO 00/62923 | 10/2000 |
| WO | WO 01/02083 | 1/2001 |
| WO | WO 02/070106 A1 | 9/2002 |
| WO | WO 03/011437 | 2/2003 |
| WO | WO 03/051488 A1 | 6/2003 |
| WO | WO 03/082773 | 10/2003 |
| WO | WO 2004/011124 A1 | 2/2004 |
| WO | WO 2004/011386 A1 | 2/2004 |

* cited by examiner

*Primary Examiner*—Jerry A. Lorengo
*Assistant Examiner*—Patricia L Hailey

(57) ABSTRACT

A porous ceramic body having increased strength is formed by exposing a porous ceramic body to a source of boron and heating the porous body to a sufficient temperature in an oxygen containing atmosphere to form the porous ceramic body. The porous ceramic body has a boron containing oxide glassy phase on at least a portion of the ceramic grains of the porous ceramic body.

29 Claims, No Drawings

METHOD FOR INCREASING THE STRENGTH OF POROUS CERAMIC BODIES AND BODIES MADE THEREFROM

CROSS-REFERENCE TO RELATED APPLICATION

This application claims the benefit of U.S. Provisional Application Ser. No. 60/564,011, filed Apr. 21, 2004, which is hereby incorporated by reference.

FIELD OF THE INVENTION

The invention relates to improved highly porous ceramic bodies useful to make, for example, filters.

BACKGROUND OF THE INVENTION

Porous ceramics have been used in a variety of applications such as filters and catalyst substrates. Recently more stringent diesel particle emission standards have been promulgated in the United States and Europe. To achieve these more stringent particle emission standards, diesel particulate filters are expected to be necessary.

These particulate filters will have to meet multiple contradictory exacting requirements. For example, the filter must have sufficient porosity (generally greater than 55 percent porosity) while still retaining most of the emitted micrometer sized diesel particulates (generally greater than 90 percent capture of the emitted particulates). The filter must also be permeable enough so that excessive back pressure does not occur too quickly, while still being able to be loaded with a great amount of soot before being regenerated. The filter must withstand the corrosive exhaust environment for long periods of time. The filter must have an initial strength to be placed into a container attached to the exhaust system.

Most importantly, the filter must be able to withstand thermal shock from rapid heating and cooling, for example, due to being exposed to a puddle at operating temperature and burning off the soot to regenerate the filter. From these stringent criteria, ceramic filters have been the choice of material to develop a diesel particulate filter.

Early on, ceramic filters of sintered cordierite were explored as a possible diesel particulate filter. Cordierite was explored because of its low cost and use as a three-way catalyst support in automotive exhaust systems. Unfortunately, cordierite has not displayed the capability of high porosity, high permeability and high soot loading in conjunction with the thermal shock resistance and abusive environment experienced during regeneration and operation.

More recently, silicon carbide has become of interest as a filter material because of its high strength and high melting point compared to cordierite. However, silicon carbide suffers, for example, from having to be sintered at high temperature using expensive fine silicon carbide powder. Even with this improved strength, SiC diesel particulate filters have been made by cementing segments of SiC honeycombs together to manage the thermal stresses by preferentially causing cracking in the cement as opposed to the SiC honeycombs themselves. This cementing leads to increased complexity and is at best an interim solution.

To lessen the thermal stresses associated with the burning of the soot in the filter, soot catalysts and engine management protocols have been used to lessen the temperature where the soot is combusted. Even so SiC filters still have to be made by cementing segments of SiC honeycombs together to manage the thermal stresses.

What is needed is a filter that has increased strength while at least having the same or improved thermal shock resistance. Thermal shock resistance is proportional to the strength of the body and inversely proportional to the elastic moduli (i.e., stiffness) and the coefficient of expansion. Unfortunately, simply increasing the strength of a porous body has typically increased the density (lowered the porosity) and/or increased the elastic moduli resulting in, many instances, reductions or no improvement of the thermal shock resistance.

Accordingly, it would be desirable to provide a porous ceramic body and method to form such a body that has, for example, increased strength while having the same or improved thermal shock resistance without substantially diminishing the porosity of the filter.

SUMMARY OF THE INVENTION

A first aspect of the invention is a method of increasing the strength of a porous ceramic body comprising:
  (a) exposing a porous ceramic body comprised of ceramic grains essentially chemically bound together to a source of boron and
  (b) heating the porous body in an oxygen containing atmosphere to a temperature sufficient to form the porous ceramic body having increased strength.

The method substantially increases the strength of the porous body without decreasing the porosity of the body. In addition, the method also has allowed the formation of a stronger porous body without a concurrent increase in its elastic moduli and decrease in porosity such that, surprisingly, the body may have improved thermal shock resistance.

A second aspect of the invention is a porous ceramic body comprised of ceramic grains that are fused together, wherein, on at least a portion of the ceramic grains, there is an oxide glassy phase containing boron.

DETAILED DESCRIPTION OF THE INVENTION

The method of the invention involves exposing a porous ceramic body comprised of ceramic grains essentially chemically bound together to a source of boron. Grains essentially chemically bound together means that the grains of the ceramic have been essentially fused together by a ceramic phase such as a glass, ordered or disordered crystalline ceramic phase or combination thereof. Typically, the ceramic body is made by heating to a temperature sufficient to sinter the grains together by solid state diffusion or formation of liquid ceramic phase that fuses the ceramic grains together.

The porous ceramic body may be any suitable ceramic such as those known in the art. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. No. 6,669,751B1 and WO publications EP1142619A1, WO 2002/070106A1. Other suitable porous bodies are described by WO 2004/011386A1, WO 2004/011124A1, US 2004/0020359A1 and WO 2003/051488A1.

The mullite is preferably a mullite having an acicular microstructure. Examples of such acicular ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The porous ceramic body, generally, has a porosity of about 30% to 85%. Preferably, the porous ceramic body has a porosity of at least about 40%, more preferably at least about 45%, even more preferably at least about 50%, and most preferably at least about 55% to preferably at most about 80%, more preferably at most about 75%, and most preferably at most about 70%.

The boron source may be present in the porous ceramic body prior to heating so long as the boron is able to diffuse and form a glassy oxide phase such that the porous body has increased strength compared to the same body without heating in an oxygen containing atmosphere. Generally the porous body is exposed to the boron source either during the heating of step (b) or a coating is applied to the porous ceramic prior to the heating of step (b). If the porous ceramic body is exposed during the heating of step (b), the boron source must be sufficiently volatile at the temperature to increase the strength.

Preferably, the boron source is coated on the porous ceramic body prior to the heating of the porous body. Any suitable method of coating the porous ceramic body may be used such as known gas phase deposition, solution or slurry coating methods. It is, particularly preferred, to use a coating method that uniformly coats the porous ceramic body. For example, the boron source is dissolved in a liquid, the solution is introduced into the porous ceramic body and the boron source is precipitated out by a known method such as changing the pH, temperature or addition of a salt. In a preferred embodiment, a boron source is also separately provided during the heating of porous bodies previously coated with the boron source.

Exemplary application methods include those described in U.S. Pat. Nos. 4,515,758; 4,740,360; 5,013,705; 5,063,192; 5,130,109; 5,254,519; 5,993,762; and U.S. Patent Application Publications 2002/0044897; 2002/0197191 and 2003/0124037; International Patent Publication WO97/00119; WO 99/12642; WO 00/62923; WO 01/02083 and WO 03/011437; and Great Britain Patent No. 1,119,180.

After the boron source is deposited from a liquid onto the porous ceramic body, the excess remaining liquid is dried. This drying may be done at ambient temperature or up to about 400° C. The time may be any practical time ranging from mere seconds to days. The heating method may be any suitable one such as those known in the art. Examples include ovens using resistance, induction, microwave heating or combination thereof.

The boron source may be any suitable source that is capable of forming an oxide glass phase containing boron at the temperature of the heating step. Exemplary boron sources include boron oxide, boric acid, organic borates (e.g., trimethylborate, triphenylborate, triethylborate), boron carbide, boron nitride, o-carborane, ammonium pentaborate, ammonium tetraphenyl borate, metal borides (e.g., titanium diboride, calcium hexaboride, silicon hexaboride, rare earth borides, and aluminum borides), metal borates (e.g., calcium borate, magnesium borate, sodium borate and rare earth borates), or combination thereof. Preferably, the boron source is boron carbide, boron oxide, boric acid, organic borate or combination thereof. More preferably, the boron source is boric oxide, boric acid or combination thereof.

If the boron source is to be separately provided during the heating of the porous ceramic bodies, the boron source is preferably in the form of a powder within a refractory container within the furnace. When the boron source is provided as such, it is preferably boric acid, boron oxide, boron carbide or combination thereof.

The amount of boron source may be any amount so long as there is a sufficient amount to form the oxide glass containing boron such that the strength is increased, but not so much that the porosity of the porous ceramic body decreases substantially (i.e., the porosity decreases no more than, for example, 65% porosity to 60% porosity). Porosity herein means the amount of the body that is pores by volume. Generally, the amount of boron source that the porous ceramic body is exposed to is an amount that increases the amount of boron by at least 0.1% by weight within the porous ceramic body. Preferably the amount of boron present in the porous ceramic body increases by 0.5%, more preferably at least about 2%, and most preferably at least about 4% to preferably at most about at 20%, more preferably at most about 10%, most preferably at most about 6% by weight of the porous ceramic body.

To form the porous ceramic body having increased strength, the porous ceramic body is heated in an oxygen containing atmosphere to a temperature and time sufficient to create an oxide glass phase containing boron on at least a portion of the ceramic grains. Generally, the temperature is at least 900° C. to at most about 1500° C. Preferably, the temperature is at least about 950° C., more preferably at least about 1000° C. and most preferably at least about 1050° C. to preferably at most about 1450° C., more preferably at most about 1400° C., and most preferably at most about 1350° C.

The time at the heating temperature, may be any practicable time such as several minutes to several days. Typically the time is at least about 10 minutes, more preferably at least about 20 minutes, even more preferably at least about 30 minutes and most preferably at least about 1 hour to preferably at most about 2 days, more preferably at most about 1 day, even more preferably at most about 8 hours, and most preferably at most about 4 hours.

The atmosphere during heating must contain a sufficient amount of oxygen such that an oxide glassy phase containing boron is formed. For example, static atmospheres where the oxygen in the atmosphere arises from the boron source or the porous ceramic body may be sufficient. Preferably, the atmosphere is oxygen mixed with one or more gases that substantially fail to react with the porous ceramic body or boron source such as nitrogen and inert gases (e.g., noble gases). In a preferred embodiment the atmosphere is air. The pressure of the gas may be any suitable pressure, but raised pressures are not necessary and atmospheric pressure is preferred.

In addition to the boron source, the porous ceramic body may be exposed to one or more second compounds to further improve the strength, thermal shock resistance or other property such as acid resistance. Exemplary second compounds include compounds that have one or more rare earth metals, $ZrO_2$, $SnO_2$, SiC, $Si_3N_4$, $SiO_2$, $Al_2O_3$ or combination thereof. Advantageously, the second compound is a rare earth compound, which may be added with another compound that is incorporated into the oxide glass containing boron upon heating the porous ceramic body. Preferably, the second compound is SiC, $ZrO_2$, $SiO_2$, $SnO_2$, $Si_3N_4$ or combination thereof. More preferably, the second compound is SiC, $SiO_2$, $Si_3N_4$ or combination thereof.

The method of the present invention forms a porous ceramic body comprised of ceramic grains that are fused together, wherein, on at least a portion of the ceramic grains, there is an oxide glassy phase containing boron. The oxide glassy phase contains elements other than oxygen and boron. These other elements may arise from the ceramic porous body (e.g., silica or aluminum from a mullite body), impurities within the ceramic porous body (e.g., impurities from clay, silica or alumina used to form mullite), or the second compounds described above. The boron source is believed to interact with the grain surfaces or glassy boundary phases of the porous ceramic body such that it heals flaw sites that decrease the strength of the body. It may also have some other unknown effects.

Generally, the amount of oxide glassy phase containing boron is present in the porous ceramic body in an amount that is from about 3% to at most about 40% by weight of the porous ceramic body. Preferably, the amount of the glassy phase is at least about 5% and more preferably at least about 8% to preferably at most about 30%, more preferably at most about 20%, and most preferably at most about 15% by weight of the porous ceramic body. The amount of glassy phase may be determined by known techniques such as electron microscopy.

Since it is difficult to detect the amount of boron via electron microscopic techniques, particularly at low concentrations and such detection is dependent on the material being analyzed, the amount of boron may be determined by acid digestion. This may require, for example, grinding and oxidation of a portion of a non-oxide porous body prior to the acid digestion. The amount of boron may be determined using nuclear magnetic resonance. Generally, the amount of boron in the porous ceramic body is from about 0.1% to about 25% by weight of the porous body. Preferably, the amount of boron is at least about 0.5%, more preferably at least about 1%, and most preferably at least about 1.5% to preferably at most about 20%, more preferably at most about 15%, most preferably at most about 10% by weight of the porous ceramic body.

Generally, the strength of the porous ceramic bodies of the present invention is at least about 10% greater than the same porous body that fails to have the boron containing glass phase. Preferably, the strength is at least about 20%, more preferably at least about 40% and most preferably at least about 60% greater than the strength of the same porous body failing to have the boron containing glass phase.

The method in addition to increasing the strength, surprisingly, also advantageously forms a porous ceramic body having improved thermal shock resistance. The thermal shock resistance may be calculated by the thermal shock factor (TSF) given by:

$$TSF=MOR/(E*\alpha)$$

where MOR is the modulus of rupture given in (Pa), E is the elastic modulus given in (Pa), and $\alpha$ is the linear coefficient of thermal expansion given by (1/° C.). This factor has units of degrees C where the higher the value the greater the resistance to thermal shock.

Generally, the thermal shock factor of the porous ceramic bodies of the present invention is at least about 10% greater than the same porous body that fails to have the boron containing glass phase. Preferably, the thermal shock factor is at least about 20%, more preferably at least about 30% and most preferably at least about 40% greater than the thermal shock factor of the same porous body failing to have the boron containing glass phase.

Even though the oxide glassy phase containing boron may only be on a portion of the ceramic grains of the porous ceramic body, it is preferred that it is uniformly distributed within the porous ceramic body. On a portion of the ceramic grains generally, means that at least about 10% of the grains have some oxide glassy phase containing boron. Preferably, at least about 50%, more preferably at least about 75%, even more preferably at least about 90% and most preferably at least 95% of the grains have some oxide glassy phase containing boron thereon.

The porous ceramic bodies of the present invention are particularly useful as a particulate (soot) trap and oxidation (i.e., exhaust) catalyst for mobile power applications (e.g., diesel engines) and stationary power applications (e.g., back-up power plants). The porous ceramic bodies, when used as a diesel particulate trap, may have at least a portion of the ceramic grains coated with a catalyst. Of course, the porous ceramic body may be useful as soot trap itself without any catalyst.

EXAMPLES

Examples 1-5

Bend bar specimens 2 cells by 5 cells by 40-75 mm were cut from a nominally 175 cpsi (cells per square inch) acicular mullite honeycomb, which was prepared in the same manner as described in Example 4 of WO 03/082773A1. The honeycomb after being formed was also heat treated at 1400° C. for 2 hours as described in Example 4 of WO 03/082773A1. Sets of 4-6 bars were impregnated with 90° C. aqueous $B_2O_3$ solutions ranging from 4% to 10% by weight. Excess solution was blown out of the channels, and the parts were cooled to 0° C. prior to drying at room temperature under dry flowing nitrogen. After drying, the bars were heated in air at 1400° C. for 2 hours in a covered alumina tray. One set was treated twice. A set of 23 bars was left untreated and is referred to herein as comparative example 1. Results of these examples appear in Table 1.

TABLE 1

| Example | % Mass gain | Strength, MPa | TSF, ° C. | # of bars broken |
|---|---|---|---|---|
| Comp. Ex. 1 | N/A | 24.6 | 269 | 23 |
| Example 1 | 2.5 | 34.9 | 326 | 5 |
| Example 2 | 3.5 | 41.8 | 382 | 4 |
| Example 3 | 4.5 | 37.8 | 344 | 6 |
| Example 4 | 6.7 | 40.9 | 351 | 6 |
| Example 5[d] | 8.6 | 39.6 | 332 | 5 |

TSF = Thermal Shock Factor
N/A = not applicable
(d) = double application of $B_2O_3$.

Example 6

$B_2O_3$ on Acicular Mullite Honeycomb (Uniform)

To create a uniform coating of $B_2O_3$ on a honeycomb, the walls of a 5.66" diameter×6" long nominally 175 cpsi acicular mullite honeycomb made in the same way as described above were filled with a 90° C. aqueous 8 wt % $B_2O_3$ solution. The honeycomb was placed in an insulated vessel and cooled to 1° C. where it was slowly dried over a 14 day period under a slow flow of dry $N_2$. The dried part was then heated in air at 1400° C. for 2 hours. The total mass increased by 4%.

Thermal stress testing of the honeycomb was carried out by placing the part in a preheated furnace, allowing it to thermally equilibrate, then removing it from the furnace and allowing it to cool under ambient conditions at successively higher temperatures until it mechanically failed (i.e., the honeycomb visibly cracked). Failure of the part occurred in the second cycle at 390° C. Mechanical test bars cut from the outer quarter and the core of the honeycomb gave statistically equivalent average strengths and thermal shock factors of 56.1 MPa and 338° C. and 55.4 MPa and 328° C., respectively.

Example 7

$B_2O_3$ on Acicular Mullite Honeycomb
(Non-uniform)

A honeycomb having a non-uniform coating of $B_2O_3$ was created as follows. The walls of a 5.66" diameter×6" long nominally 175 cpsi acicular mullite honeycomb made in the same way as described above were filled with a 90° C. aqueous 8 wt % $B_2O_3$ solution. The impregnated honeycomb was dried at 110° C. in an oven. The dried part was then heated in air to 1400° C. for 2 hours. The mass increases by 4%. The part failed in thermal stress testing during the second cycle at 390° C. Mechanical test bars cut from the outer quarter and the core of the honeycomb showed average strengths and thermal shock factors of 56.1 MPa and 314° C. and 31.6 MPa and 209° C., respectively. The lower strengths and thermal shock factors of the interior bars has been attributed to the wicking of the $B_2O_3$ solution to the exterior of the honeycomb during drying thus leaving less $B_2O_3$ in the interior bars.

Example 8

$B_2O_3$ on Ce-doped Acicular Mullite

In this Example, a nominally 175 cpsi ceria-doped acicular mullite honeycomb (4% wt % $CeO_2$) was used. The ceria doped honeycomb was made in the same manner as described in Example 4 of WO 03/082773A1 except that sufficient cerium (III) acetate was added to the extrusion mix to produce acicular mullite with a $CeO_2$ content of 4 wt %. Bend bars were made in the same manner as described for Examples 1-5, wherein an 8 wt % $B_2O_3$ aqueous solution was used to treat the bend bars. After being heated to 1400° C. for 2 hours, the bars mass increased by 2.9%. These $B_2O_3$ treated bars had an average strength of 64.0 MPa and a mean TSF of 344° C., while untreated bars from the same honeycomb (i.e., Comparative Example 2) had an average strength of 39.9 MPa and a mean TSF of 240° C.

Example 9

$B_2O_3$ and $Nd_2O_3$ Treated Acicular Mullite

Bend bar specimens were prepared and treated as described in Examples 1-5 except that an aqueous solution containing 8 wt % $B_2O_3$ and 6 wt % $Nd(NO_3)3.6H_2O$ was used for the impregnation. The mass gain measured after heat treatment at 1400° C. for 2 hours was 7.1%. The bars had an average strength of 36.0 MPa and a mean TSF of 340° C. Bars that were untreated from the same honeycomb (i.e., Comparative Example 3) had an average strength of 22.6 MPa and a mean TSF of 266° C.

Example 10

$B_2O_3$ on SiC

Bend bar specimens were prepared and treated as described for Examples 1-5 except that a nominally 200 cpsi silicon carbide, available from Ibiden Co., LTD, Ogaki-shi, Japan diesel particulate filter and an 8 wt % $B_2O_3$ aqueous solution were used. The $B_2O_3$ treated bars had an average strength of 90.6 MPa and a mean TSF of 176° C., while untreated bars from the same honeycomb (Comparative Example 4) had an average strength of 59.8 MPa and a mean TSF of 128° C.

Example 11

$B_2O_3$ on Cordierite

Bend bar specimens were prepared and treated as described for Examples 1-5 except that a nominally 200 cpsi cordierite diesel particulate filter (Corning Incorporated, Corning, N.Y.) and a 10 wt % $B_2O_3$ aqueous solution were used. The $B_2O_3$ treated bars had an average strength of 17.8 MPa and a mean TSF of 703° C., while untreated bars (Comparative Example 5) from the same honeycomb had average strength of 9.2 MPa and a mean TSF of 671° C.

Example 12

$B_2O_3$ and SiC on Acicular Mullite

Bend bars were prepared as described for Examples 1-5 and coated with a polymeric SiC precursor (allylhydridopolycarbosilane) (Starfire Systems Inc., Watervliet, N.Y., SP-Matrix Polymer) by immersing each bar in the precursor, blowing out the excess, then drying at 110° C. The dried bars were heated slowly under nitrogen to 1000° C. for one hour then cooled at 5° C./min. to room temperature. The process resulted in a SiC coating in which the weight of the bars each increased by about 8%. The SiC coated bars were then impregnated with a 90° C. 8% by wt $B_2O_3$ aqueous solution, cooled, dried, and heat treated in air as described for Examples 1-5. The bars total mass increased by about 11.6% after the SiC and $B_2O_3$ treatments. The bars had an average strength of 58.3 MPa and a mean TSF of 314° C.

What is claimed is:

1. A method of increasing the strength of a porous ceramic body comprising:
    (a) exposing a porous ceramic body comprised of ceramic grains essentially chemically bound together to a source of boron, wherein the source of boron is uniformly distributed such that the amount of boron is essentially the same at the interior and exterior of the porous ceramic body and
    (b) heating the porous body in an oxygen containing atmosphere to a temperature sufficient to form the porous ceramic body having increased strength.

2. The method of claim 1, wherein the porous ceramic body is exposed to the source of boron by impregnating a liquid having dissolved therein the source of boron and removing the liquid such that the source of boron is deposited on at least a portion of the ceramic grains of the porous ceramic body.

3. The method of claim 2, wherein the source of boron is precipitated from the liquid and the liquid is subsequently removed.

4. The method of claim 3, wherein the source of boron is precipitated by changing the pH, temperature or combination thereof.

5. The method of claim 1, wherein the source of boron is boron oxide, boric acid, an organic borate, boron carbide, boron nitride, o-carborane, ammonium pentaborate, ammonium tetraphenyl borate, a metal boride, a metal borate or combination thereof.

6. The method of claim 5, wherein the source of boron is boron carbide, boron oxide, boric acid, an organic borate or combination thereof.

7. The method of claim 1, wherein the porous ceramic body is exposed to the source of boron by heating, simultaneously, a separately provided source of boron along with the porous ceramic body.

8. The method of claim 1, wherein the heating is in air.

9. The method of claim 1, wherein the heating is to a temperature of at least about 1000° C. to at most about 1450° C.

10. The method of claim 1 wherein the porous ceramic body is silicon nitride, aluminum titanate, silicon carbide, cordierite and mullite or combination thereof.

11. The method of claim 10, wherein the porous ceramic body is silicon carbide, cordierite and mullite or combination thereof.

12. The method of claim 11 wherein the porous ceramic body is mullite.

13. The method of claim 12, wherein the porous ceramic body is acicular mullite.

14. The method of claim 1, wherein the porous ceramic body is a diesel particulate filter.

15. A porous ceramic body comprised of ceramic grains that are fused together, wherein, on at least a portion of the ceramic grains, there is an oxide glassy phase containing boron and said oxide containing glassy phase containing boron is uniformly distributed such that the amount of boron is essentially the same at the interior and exterior of the porous ceramic body.

16. The porous ceramic body of claim 15, wherein the porous ceramic body is mullite, silicon carbide, cordierite, aluminum titanate or combination thereof.

17. The porous ceramic body of claim 16, wherein the ceramic body is mullite or silicon carbide.

18. The porous ceramic body of claim 17, wherein the porous ceramic body is mullite.

19. The porous ceramic body of claim 18, wherein the ceramic body is acicular mullite.

20. The porous ceramic body of claim 15, wherein the oxide glassy phase containing boron is comprised of a rare earth metal, Zr, Hf, Sn, Si, N, C, Al or combination thereof.

21. The porous ceramic body of claim 20, wherein the oxide glassy phase containing boron is comprised of a Nd, Ce, Zr, Sn, Si, N, C, Al or combination thereof.

22. The porous ceramic body of claim 15, wherein the porous ceramic body has a strength that is at least 10% greater than a like porous ceramic body lacking the oxide glassy phase containing boron.

23. The porous ceramic body of claim 22, wherein the porous ceramic body has a thermal shock factor that is at least about 20% greater than a like porous ceramic body lacking the oxide glassy phase containing boron.

24. The porous ceramic body of claim 15, wherein the porous ceramic body has an amount of boron of at least about 0.01% by weight of the porous ceramic body.

25. The porous ceramic body of claim 24, wherein the porous ceramic body is mullite.

26. A filter comprised of the porous ceramic body of claim 15.

27. The filter of claim 26, wherein the filter is a diesel particulate filter.

28. The filter of claim 27, wherein the filter has a catalyst thereon.

29. The porous ceramic body of claim 22 wherein the porous ceramic body has a thermal shock factor that is at least about 10% greater than a like porous ceramic body lacking the oxide glassy phase containing boron.

* * * * *